(12) United States Patent
Hosokawa

(10) Patent No.: US 7,496,160 B2
(45) Date of Patent: Feb. 24, 2009

(54) FREQUENCY OFFSET DETECTION PROCESSING SYSTEM AND FREQUENCY OFFSET DETECTION PROCESSING METHOD USING THE SAME

(75) Inventor: Taisuke Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 678 days.

(21) Appl. No.: 10/827,260

(22) Filed: Apr. 20, 2004

(65) Prior Publication Data

US 2004/0252795 A1  Dec. 16, 2004

(30) Foreign Application Priority Data

Apr. 25, 2003 (JP) .............................. 2003-121729

(51) Int. Cl.
*H04L 27/14* (2006.01)
(52) U.S. Cl. ...................................... 375/344; 375/371
(58) Field of Classification Search ................. 375/344, 375/371
See application file for complete search history.

(56) References Cited

U.S. PATENT DOCUMENTS

| | | | | |
|---|---|---|---|---|
| 6,226,505 | B1* | 5/2001 | Uda | 455/255 |
| 6,597,728 | B1* | 7/2003 | Kondo | 375/149 |
| 2001/0004373 | A1* | 6/2001 | Hirata | 375/130 |
| 2004/0190438 | A1* | 9/2004 | Maltsev et al. | 370/206 |

FOREIGN PATENT DOCUMENTS

| | | |
|---|---|---|
| EP | 0 389 974 | 10/1990 |
| EP | 1 063 779 A2 | 12/2000 |
| EP | 1 241 846 A2 | 9/2002 |
| GB | 2 354 678 A | 3/2001 |
| JP | 9-233139 | 9/1997 |

OTHER PUBLICATIONS

European Search Report dated Jul. 5, 2006.

* cited by examiner

*Primary Examiner*—David C Payne
*Assistant Examiner*—Leon Flores
(74) *Attorney, Agent, or Firm*—McGinn IP Law Group, PLLC

(57) ABSTRACT

A frequency offset detection processing system includes a TCXO, demodulation unit, frequency offset detection unit, and AFC control unit. In the AFC control unit, a majority determination unit determines whether each of phase moving amount detection values by a plurality of frequency offsets is positive or negative and totalizes to determine which of the positive values and the negative values are larger in number. A detection value conversion unit converts the phase moving amount detection values in accordance with the majority determination result. An averaging processing unit adds the phase moving amount detection values and divides the sum by the number of added values. A correction value calculation unit calculates a frequency offset from the phase moving amounts after averaging processing. A TCXO control unit corrects TCXO control on the basis of the calculated frequency offset. A frequency offset detection processing method is also disclosed.

11 Claims, 9 Drawing Sheets

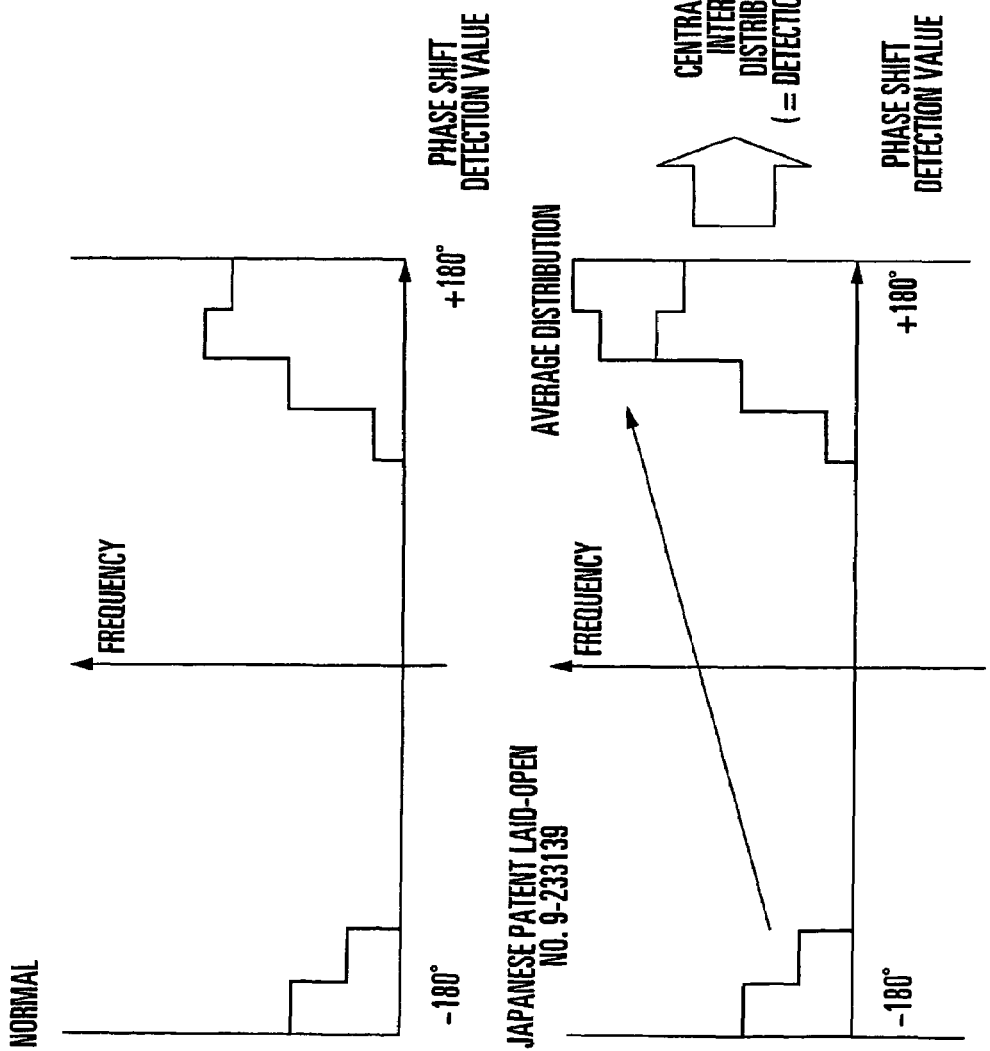

FREQUENCY OFFSET DETECTION PROCESSING SYSTEM AND FREQUENCY OFFSET DETECTION PROCESSING METHOD USING THE SAME

BACKGROUND OF THE INVENTION

The present invention relates to a frequency offset detection processing system and a frequency offset detection processing method using the same.

CDMA (Code Division Multiple Access) is one of communication schemes currently used in mobile communication systems. CDMA is a communication system in which data is spread on the transmitting side by using a code, and the transmitted data is decoded by despreading it on the receiving side by using the same code. In a mobile device, AFC (Auto Frequency Control) control is performed to make the reference frequency of the base station coincide with that of the mobile device. In AFC, the shift (frequency offset) between the reference frequency of the base station and that of the mobile device is detected from a pilot signal transmitted from the base station, and correction is executed. When a frequency offset exists, phase movement occurs between the symbol of an immediately preceding pilot signal and the current pilot signal (FIG. 7). On the basis of a phase moving amount θ, the frequency offset can be calculated by $$\Delta f = \text{Rate} \times (\theta/360°)$$

(Δf: frequency offset, θ: phase moving amount between symbols of pilot signals, Rate: symbol rate of pilot signal)

In actual radio communication, the phase of a reception signal varies due to white noise or fading. Accordingly, the accuracy of the phase moving amount detection value by a frequency offset decreases. To solve this problem, there is a method of averaging phase moving amount detection values by a plurality of frequency offsets to increase the detection accuracy. FIG. 8 shows the averaging processing. Let θ1, θ2, . . . θn be phase moving amount detection errors by a frequency offset. A detection error after the averaging processing is given by $$\theta\alpha = \sum_{k=1}^{n} \theta_k / n$$

Since the values θ1 to θn are random, they are time-averaged to 0. A detection error θα after the averaging processing is smaller than that before averaging at a high probability. For this reason, the detection error can be reduced. The theoretical frequency offset detection limit value corresponds to the phase moving amount θ within the range of −180° to +180°. If θ exceeds ±180°, the direction of shift of the frequency offset is erroneously determined. At this time, the sign of the phase moving amount detection value by the frequency offset is different from the actual sign of the phase moving amount detection value by the frequency offset. For example, when the actual phase moving amount is −190°, the detection value is +170°, i.e., the sign is erroneously determined. Under the influence of noise or fading, even when the phase moving amount does not exceed the range of −180° to +180°, the sign may erroneously be detected.

FIG. 9 shows this situation. The phase moving amount by a frequency offset is +170°. When the phase rotates by +25° due to noise, the phase moving amount is +195°. However, the detection value is −165°, i.e., an error occurs. If a detection value with a false sign is included in detection values to be added in averaging processing, the detection accuracy greatly degrades. Referring to FIG. 10, when some detection values (1), (2), and (3) have a false sign, an average θa of the detection values greatly changes from an actual phase moving amount θf.

To solve the above-described problem and increase the accuracy for detecting the shift direction of a frequency offset in AFC control, a method of executing majority determination for the detection values of the shift direction of the frequency offset is used (Japanese Patent Laid-Open No. 9-233139). In this method, to separately process the magnitude and direction of phase shift data, an automatic frequency control apparatus having a means for extracting only the magnitude information of a phase shift, a means for averaging only the magnitude information of the phase shift, a means for extracting only the direction information of the phase shift, and a means for making decision by majority for the direction information of the phase shift and selecting a direction of majority is used. The frequency of a local generation unit is controlled in accordance with the average value and majority.

Thermal noise added to a reception signal in radio communication normally has a Gaussian distribution. When measurement is executed for a sufficiently long time, the central value of the distribution of the phase shift detection values and the actual phase shift have an almost same value (FIG. 11A). However, in the above-described method described in Japanese Patent Laid-Open No. 9-233139, the distribution of phase shift detection values after conversion by the majority determination result is distorted. Hence, the central value (≈actual phase shift) of the distribution and the average value (=detection value after processing) of the distribution have different values (FIG. 11B). Hence, the phase shift detection error due to interference of thermal noise or the like cannot sufficiently be reduced.

SUMMARY OF THE INVENTION

It is an object of the present invention to provide a frequency offset detection processing system and a frequency offset detection processing method using the same, which execute majority determination and detection value conversion processing before averaging processing to increase the detection accuracy.

In order to achieve the above object, according to the present invention, there is provided a frequency offset detection processing system including a TCXO (Temperature Compensated Crystal Oscillator, Temperature Compensated X'tal Oscillator) which generates a reference frequency, a demodulation unit which demodulates a reception signal, a frequency offset detection unit which detects a frequency offset from a phase moving amount between symbols of adjacent pilot signals, and an AFC (Auto Frequency Control) control unit, wherein the AFC control unit comprises a majority determination unit which determines whether each of phase moving amount detection values by a plurality of frequency offsets, which are detected for a predetermined time and read out from the frequency offset detection unit, is a positive value or a negative value, and totalizes to determine which of the positive values and the negative values are larger in number, a detection value conversion unit which converts the phase moving amount detection values read out from the frequency offset detection unit in accordance with a majority determination result from the majority determination unit, an averaging processing unit which executes processing for adding the phase moving amount detection values read out from the frequency offset detection unit and converted by the detection value conversion unit and dividing a sum by the number of added values, a correction value calculation unit which calculates a frequency offset from the phase moving amounts after averaging processing by the averaging processing unit, and a TCXO control unit which corrects TCXO control on the basis of the frequency offset calculated by the correction value calculation unit.

BRIEF DESCRIPTION OF THE DRAWINGS

FIGS. 11A and 11B are graphs showing a state wherein the central value (≈actual phase shift) of the distribution of phase shift detection values after conversion by a majority determination result and the average value (=detection value after processing) of the distribution have different values.

DESCRIPTION OF THE PREFERRED EMBODIMENT

The embodiment of the present invention will be described below in detail.

The present invention relates to a frequency offset detection method in CDMA (Code Division Multiple Access). In frequency offset detection processing in AFC (Auto Frequency Control) control, phase moving amount values between symbols, which are detected for a predetermined time, are averaged to reduce the degradation in detection accuracy due to fading or white noise. When the phase moving amount between symbols by a frequency offset is close to ±180°, the shift direction of the frequency offset may erroneously be determined due to the influence of interference or the like. When a detection value with an erroneous shift direction is included in detection values to be added in averaging processing, the detection accuracy greatly degrades. The present invention solves this problem by determining the shift direction of a frequency offset by majority determination before averaging processing and making the signs of detection values coincide from the majority determination result.

Figure 1:
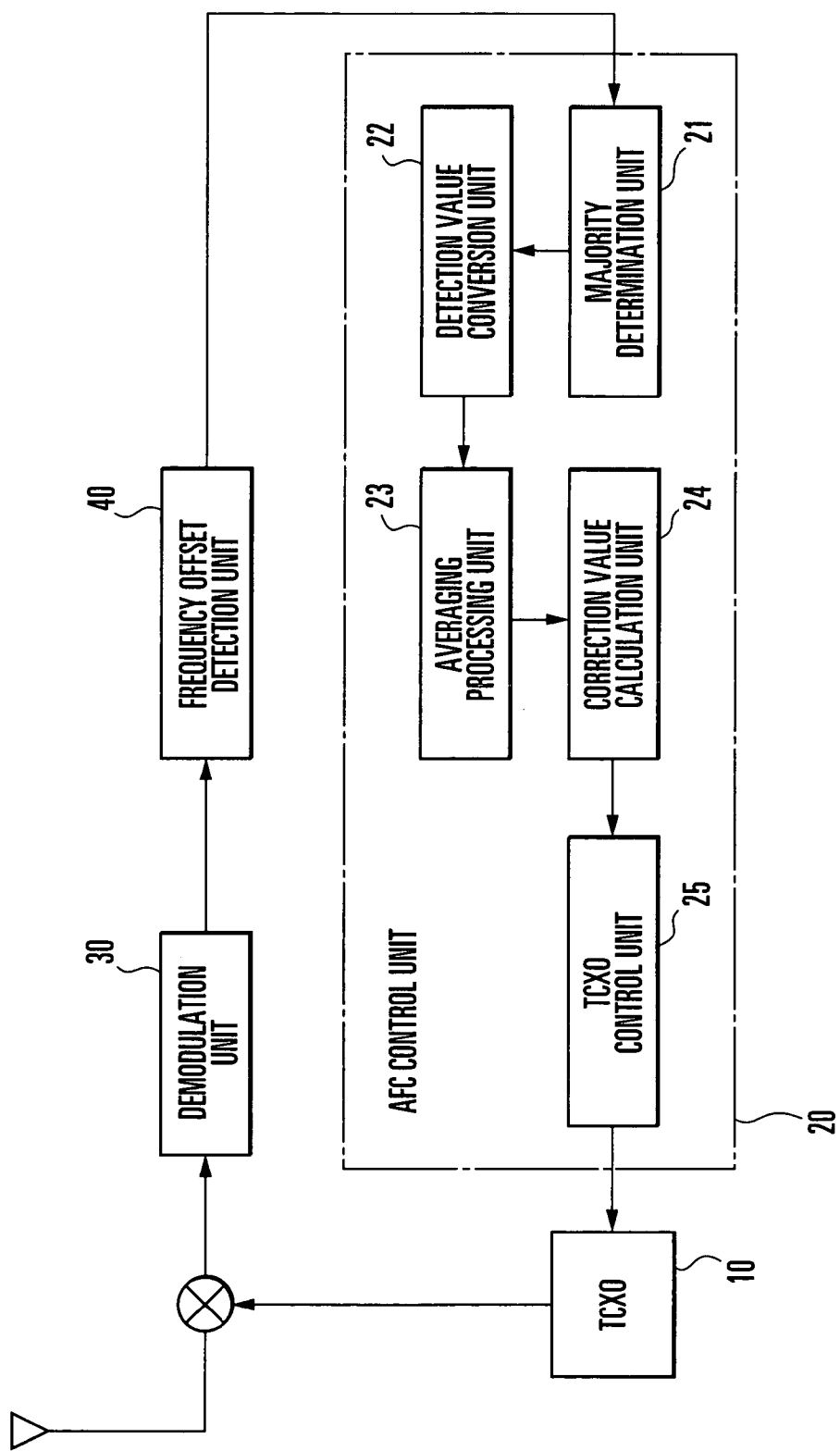
FIG. 1 is a block diagram showing the arrangement of a frequency offset detection processing system according to the embodiment of the present invention.

Referring to FIG. 1, the embodiment of the present invention includes a TCXO (Temperature Compensated Crystal Oscillator, Temperature Compensated X'tal Oscillator) 10, AFC control unit 20, demodulation unit 30, and frequency offset detection unit 40. The TCXO 10 generates a reference frequency. The demodulation unit 30 demodulates a reception signal. The frequency offset detection unit 40 detects a frequency offset from the phase moving amount between adjacent pilot symbols. The AFC control unit 20 includes a majority determination unit 21 for phase moving amount detection values by frequency offsets, a detection value conversion unit 22, an averaging processing unit 23, a correction value calculation unit 24, and a TCXO control unit 25, which execute corresponding processing operations.

Figure 2:
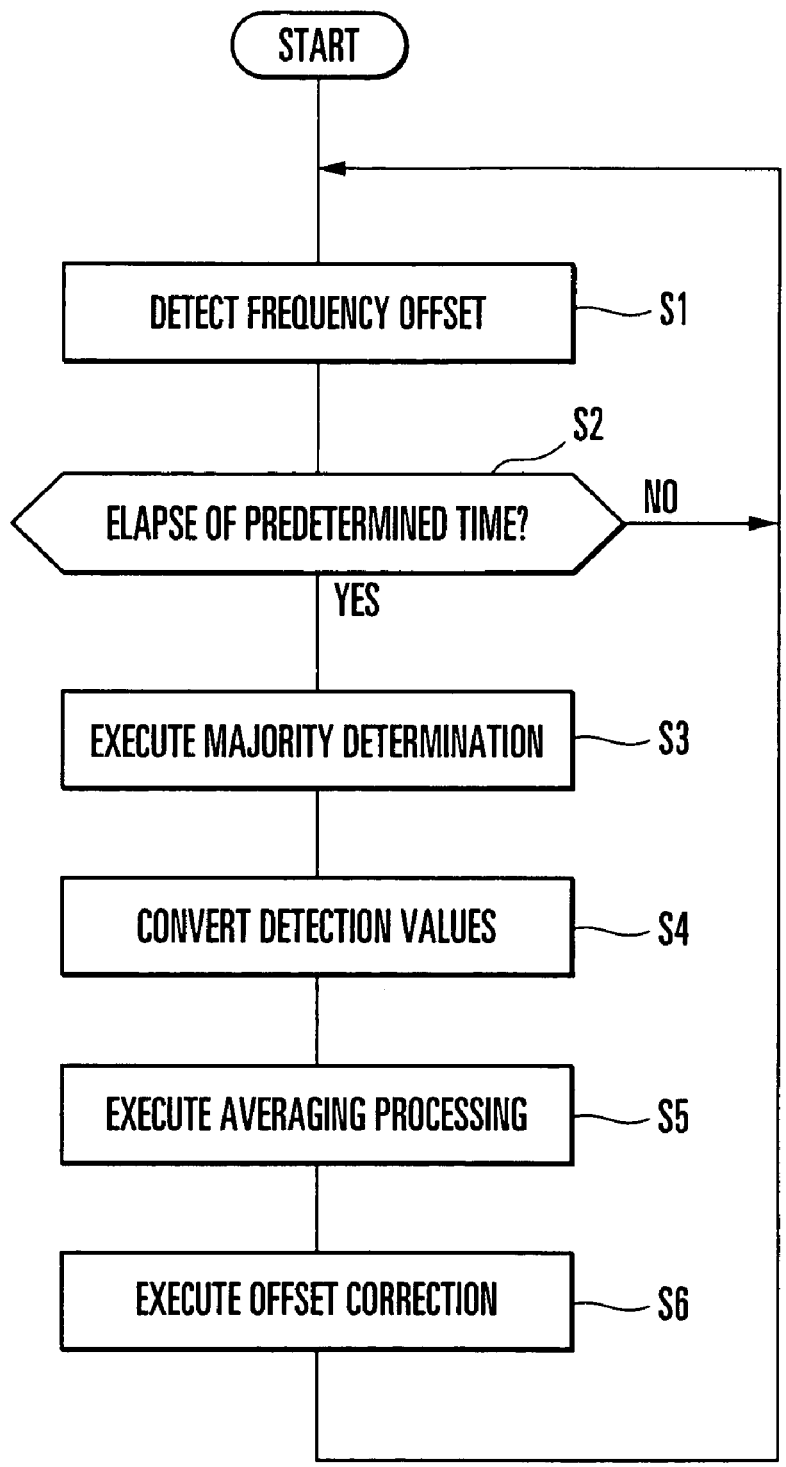
FIG. 2 is a flow chart showing a frequency offset detection processing method using the frequency offset detection processing system according to the embodiment of the present invention.
Figure 3:
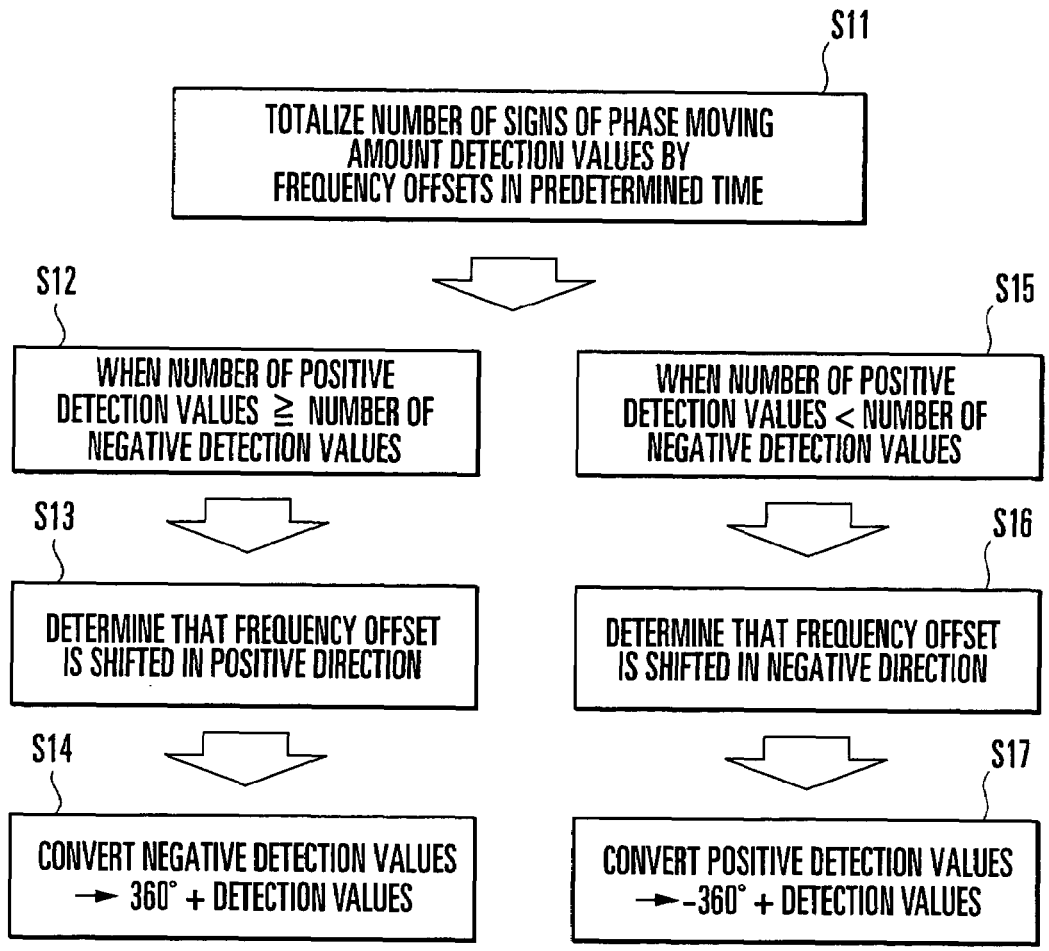
FIG. 3 is a flow chart of majority determination and conversion processing.

The overall operation of the embodiment of the present invention will be described in detail with reference to FIGS. 2 to 5. First, the frequency offset detection unit 40 detects a frequency offset from the phase moving amount between the symbols of pilot signals (FIG. 2: step S1). The demodulation unit 30 reads out values from the frequency offset detection unit and executes majority determination for phase moving amount detection values by a plurality of frequency offsets, which are detected for a predetermined time (FIG. 2: steps S2 and S3). In majority determination, it is determined whether each phase moving amount detection value by a frequency offset is a positive value or a negative value. The positive and negative values are totalized to determine which of the positive values and negative values are larger in number (FIG. 3: step S1). This processing is done to determine the shift direction of the frequency offset. Next, the phase moving amount detection values are converted in accordance with the result of majority determination (FIG. 2: step S4). Detection values with a sign, which are determined as smaller in number by majority determination, are regarded as values whose shift direction of the frequency offset is erroneously determined, and the error is corrected. The phase moving amount detection values are converted as follows.

"When the number of negative detection values is smaller" (FIG. 3: steps S12 to S14)

Negative detection values→+360°+negative detection values

"When the number of positive detection values is smaller" (FIG. 3: steps S15 to S17)

Positive detection values→−360°+positive detection values

Figure 4:
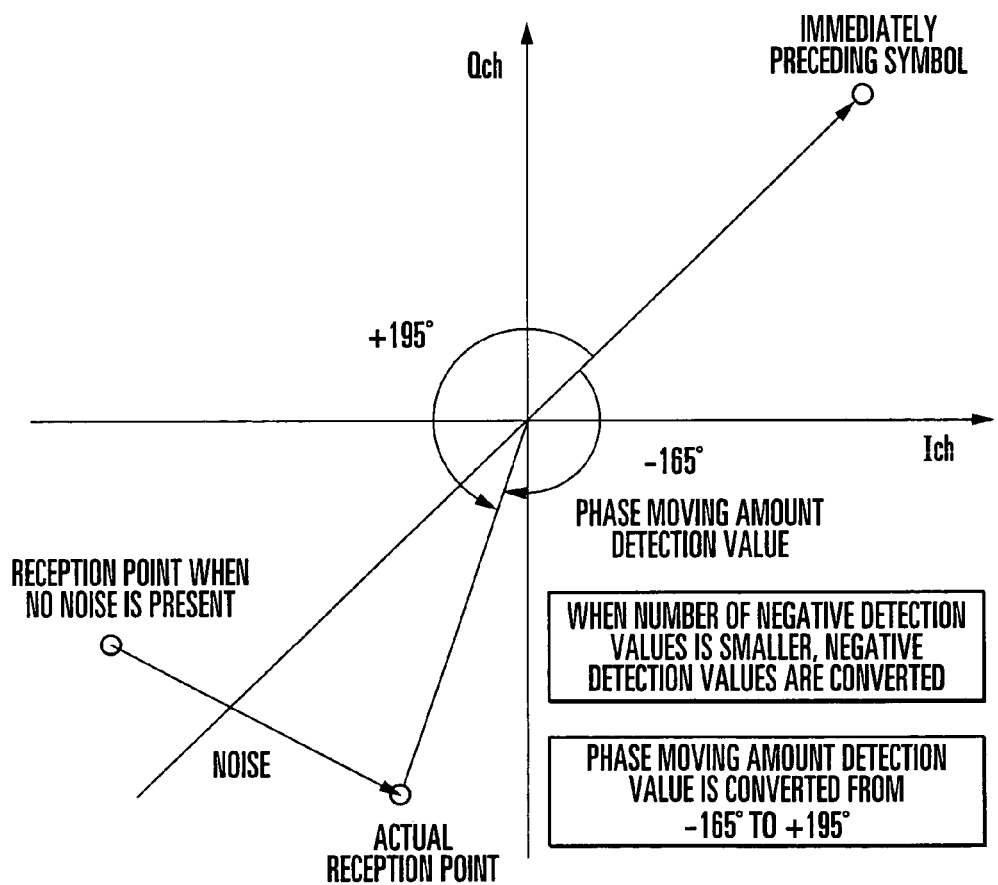
FIG. 4 is a graph showing detection value conversion processing.
Figure 8:
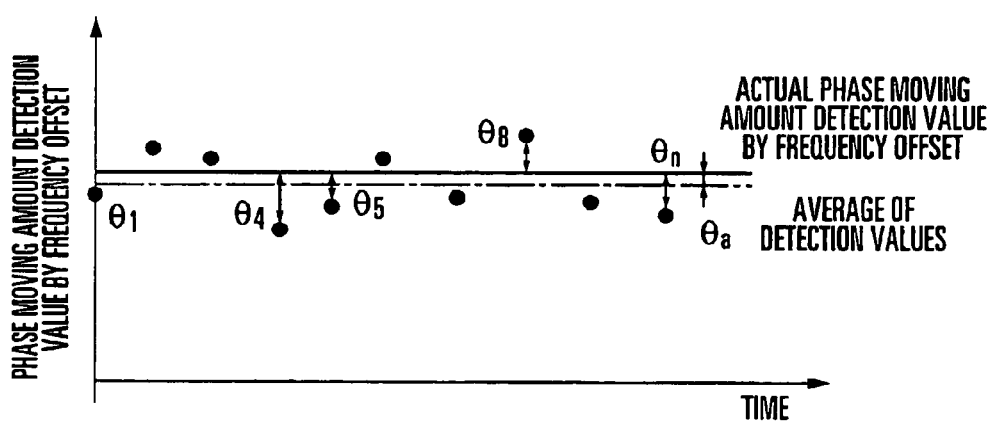
FIG. 8 is a graph showing processing for averaging phase moving amount detection values by a plurality of frequency offsets.
Figure 9:
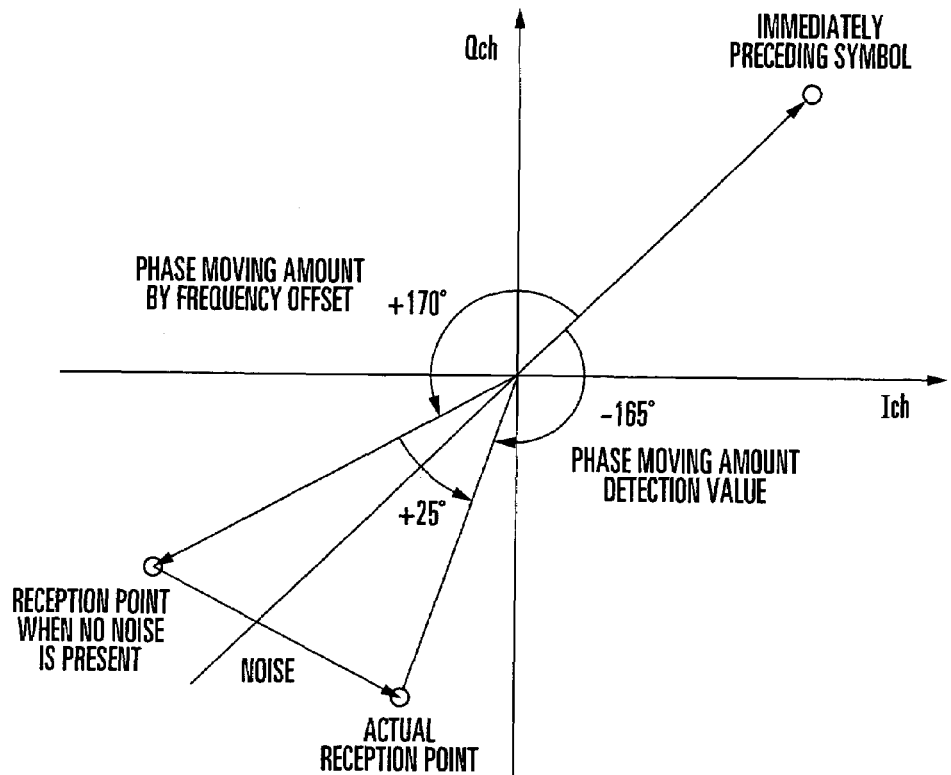
FIG. 9 is a graph showing a state wherein when the phase moving amount by a frequency offset is +170°, and the phase rotates by +25° due to noise, the phase moving amount of +195° is detected as an erroneous value of −165°.

FIG. 4 shows a state wherein the above conversion processing is applied when the phase moving amount exceeds 180° due to noise, as shown in FIG. 8. At the reception point as shown in FIG. 4, the phase moving amount detection value is −165°. When it is determined as a result of majority determination that the number of negative detection values is smaller, the negative detection values are converted. More specifically, the values are converted by

−165°→+360°−165°=+195°

With this processing, the direction of the phase moving amount erroneously detected due to the influence of noise can be corrected. Averaging processing is executed for the detection values after conversion (FIG. 2: step S5). In the averaging processing, the phase moving amount detection values by the plurality of frequency offsets, which are detected for a predetermined time, are added, and the sum is divided by the number of added values. With the averaging processing, the influence of interference components can be reduced, and the detection accuracy for the phase moving amount detection value by the frequency offset can be increased. The signs of all detection values are made to coincide by determining the shift direction before the averaging processing. Hence, even when the shift direction of the frequency offset is erroneously determined for some detection values, the detection accuracy can effectively be increased by the averaging processing.

Figure 5:
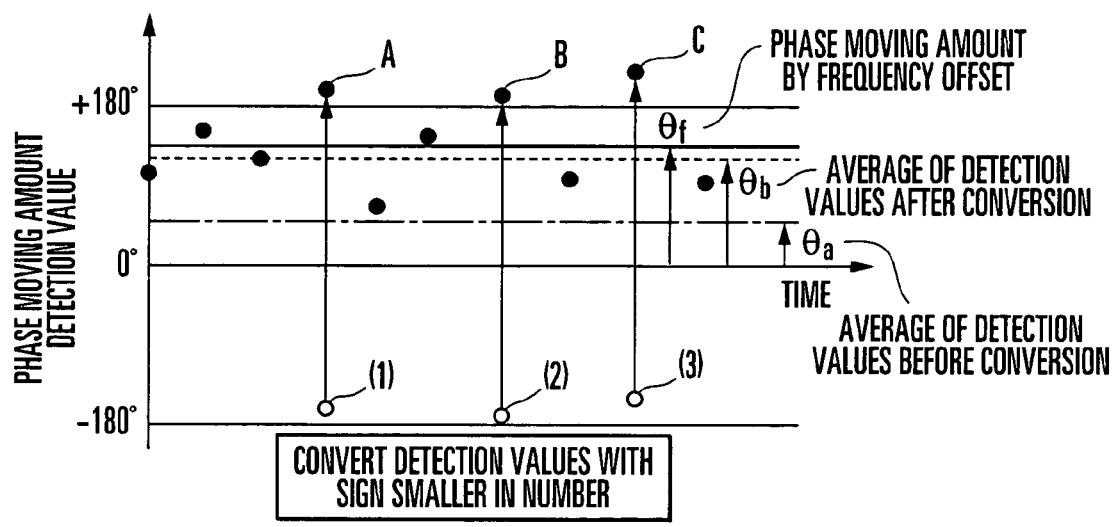
FIG. 5 is a graph showing averaging processing after conversion.
Figure 10:
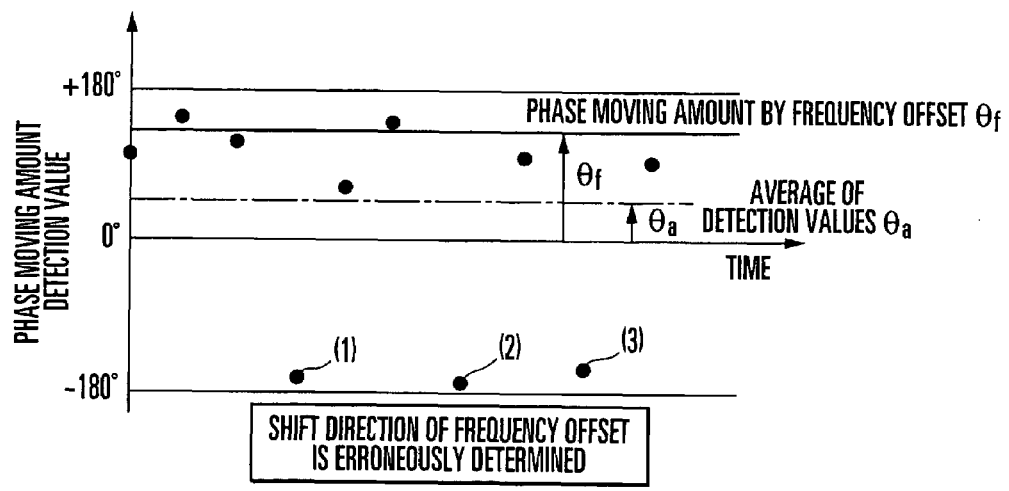
FIG. 10 is a graph showing a state wherein when some detection values have a false sign in averaging processing, an average θa of the detection values greatly changes from an actual phase moving amount θf.

FIG. 5 shows a state wherein the above conversion processing for converting the detection values with a sign, which are smaller in number, is applied when the shift direction of the frequency offset is erroneously determined, as shown in FIG. 10. Before the conversion processing is executed, the shift direction of the phase moving amount is erroneously determined for detection values (1), (2), and (3). For this reason, an average θa of the detection values greatly changes from a phase moving amount θb by the frequency offset. The values are converted as (1)→A, (2)→B, and (3)→C by the conversion processing. Accordingly, the average of the detection values is corrected as θa→θb. A value that is almost the same as the phase moving amount by the frequency offset can be detected. A frequency offset is detected from the detected phase moving amount. TCXO control is corrected on the basis of the calculated frequency offset.

Figure 6:
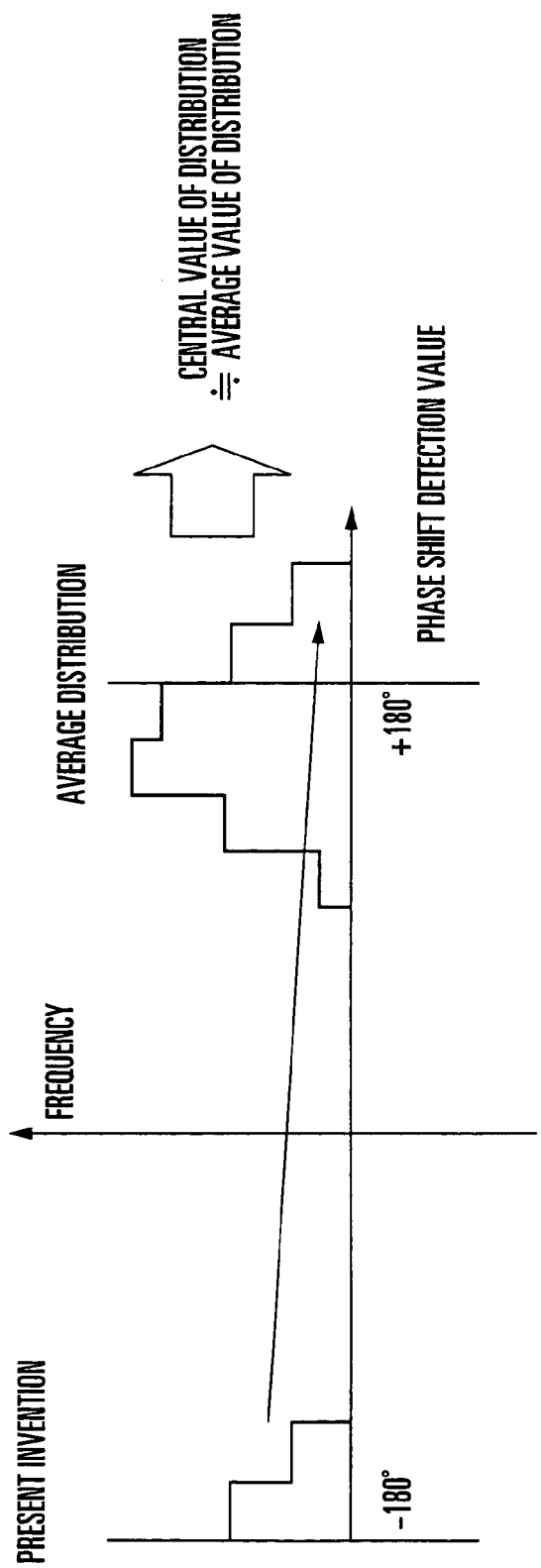
FIG. 6 is a graph showing the distribution of phase shift detection values after conversion by a majority determination result according to the present invention.
Figure 7:
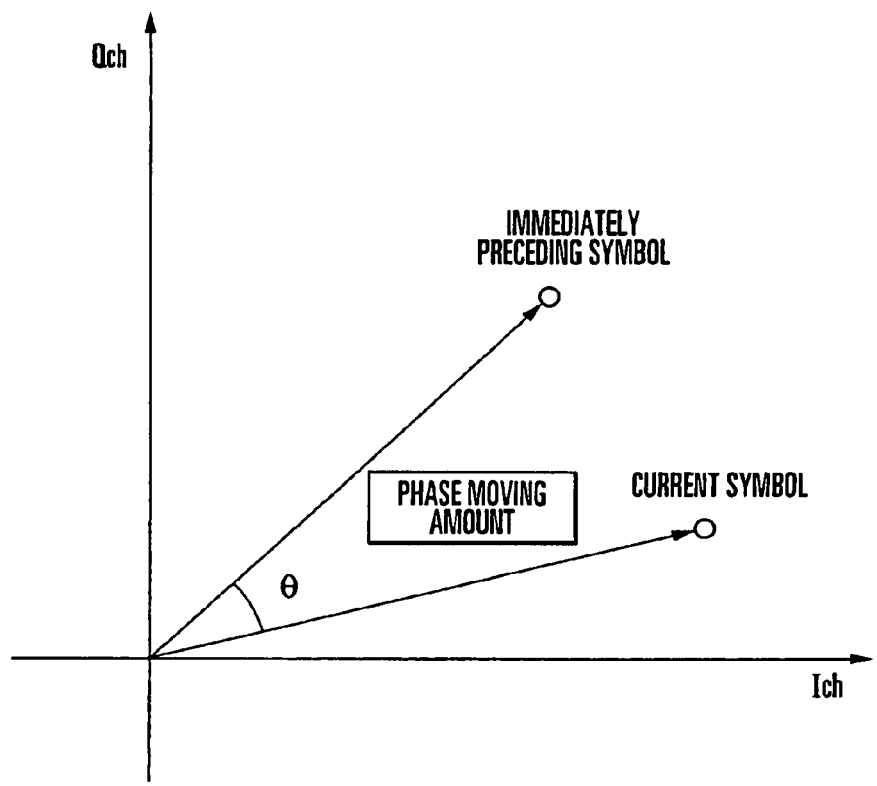
FIG. 7 is a graph showing frequency offset detection.

The distribution of the phase shift detection values after conversion by the majority determination result in this embodiment is almost a Gaussian distribution. The central value (≈actual phase shift) of the distribution and the average value (=detection value after processing) of the distribution have almost the same value (FIG. 6). Hence, the method of this embodiment can reduce the phase shift detection error caused by interference of thermal noise or the like more than the method described in Japanese Patent Laid-Open No. 9-233139.

In the embodiment of the present invention, majority determination is used as the method of determining the shift direction of a frequency offset. The determination may be done after weighting is executed in accordance with the reception power or the magnitude of the phase moving amount.

In the embodiment of the present invention, CDMA has been exemplified. However, the present invention can also be applied to any other radio communication scheme which requires frequency synchronization between a base station and a mobile device.

As described above, the present invention has the following effects.

In frequency offset detection processing in AFC control, when a phase moving amount by a frequency offset is close to ±180°, the shift direction of the frequency offset may erroneously be determined due to fading or noise. For this reason, it may be impossible to effectively execute averaging processing for reducing the detection error.

As an effect of the present invention, when majority determination and conversion processing of phase moving amount detection values by frequency offsets are executed before averaging processing, the above problem can be solved.

In addition, the distribution of the phase shift detection values after conversion by the majority determination result in the present invention is almost a Gaussian distribution. The central value (≈actual phase shift) of the distribution and the average value (=detection value after processing) of the distribution have almost the same value. Hence, the phase shift detection error due to interference of thermal noise or the like can be reduced more than the prior-art method.

What is claimed is:

1. A frequency offset detection processing system comprising:
   a TCXO (Temperature Compensated Crystal Oscillator, Temperature Compensated X'tal Oscillator) which generates a reference frequency;
   a demodulation unit which demodulates a reception signal;
   a frequency offset detection unit which detects a frequency offset from a phase moving amount between symbols of adjacent pilot signals; and
   an AFC (Auto Frequency Control) control unit, characterized in that said AFC control unit comprises:
      a majority determination unit which determines whether each of phase moving amount detection values by a plurality of frequency offsets, which are detected for a predetermined time and read out from said frequency offset detection unit, is a positive value or a negative value, and totalizes to determine which of the positive values and the negative values are larger in number;
      a detection value conversion unit which converts the phase moving amount detection values read out from said frequency offset detection unit in accordance with a majority determination result from said majority determination unit,
         wherein said detection value conversion unit converts negative phase moving amount detection values to +360°+ the negative phase moving amount detection values when it is determined that a number of negative detection values is smaller than the majority determination result; and
         wherein said detection value conversion unit converts the positive phase moving amount detection values to −360°+ the positive phase moving amount detection values when it is determined that a number of positive detection values is smaller than the majority determination result;
      an averaging processing unit which executes processing for adding the phase moving amount detection values read out from said frequency offset detection unit and converted by said detection value conversion unit and dividing a sum by the number of added values;
      a correction value calculation unit which calculates a frequency offset from the phase moving amounts after averaging processing by said averaging processing unit; and
      a TCXO control unit which corrects TCXO control on the basis of the frequency offset calculated by said correction value calculation unit.

2. The system according to claim 1, wherein said majority determination unit determines the shift direction of a frequency offset by majority determination before averaging processing and making the signs of detection values coincide from the majority determination result.

3. The system according to claim 1, wherein said majority determination unit determines the shift direction of the frequency offset.

4. The system according to claim 1, wherein detection values with a sign, which are determined as smaller in number by the majority determination unit, are regarded as values whose shift direction of the frequency offset is erroneously determined.

5. The system according to claim 1, wherein when it is determined as a result of majority determination that a number of negative detection values is smaller, the negative detection values are converted.

6. The system according to claim 1, wherein the signs of all detection values are made to coincide by determining the shift direction before the averaging processing.

7. A frequency offset detection processing method characterized by comprising:
   a Temperature Compensated Crystal Oscillator (TCXO) generating a reference frequency;
   demodulating a reception signal;
   frequency offset detection of detecting a frequency offset from a phase moving amount between symbols of adjacent pilot signals;
   majority determination of determining whether each of phase moving amount detection values by a plurality of frequency offsets, which are detected for a predetermined time and read out in the frequency offset detection, is a positive value or a negative value, and totalizing to determine which of the positive values and the negative values are larger in number;
   detection value conversion of converting negative phase moving amount detection values to +360°+the negative phase moving amount detection values when it is determined that a number of negative detection values is smaller than the majority determination result;

detection value conversion of converting positive phase moving amount detection values to −360°+the positive phase moving amount detection values when it is determined that a number of positive detection values is smaller than the majority determination result;

averaging processing of executing processing for adding the phase moving amount detection values by the plurality of frequency offsets after conversion and dividing a sum by the number of added values;

correction value calculation of calculating a frequency offset from the phase moving amounts after averaging processing; and TCXO control of correcting TCXO control on the basis of the calculated frequency offset.

8. An AFC (Auto Frequency Control) unit comprising:
a majority determination unit which determines whether each of phase moving amount detection values by a plurality of frequency offsets, which are detected for a predetermined time and read out from said frequency offset detection unit, is a positive value or a negative value, and totalizes to determine which of the positive values and the negative values are larger in number;
a detection value conversion unit which converts the phase moving amount detection values read out from said frequency offset detection unit in accordance with a majority determination result from said majority determination unit,
wherein said detection value conversion unit converts negative phase moving amount detection values to +360°+the negative phase moving amount detection values when it is determined that a number of negative detection values is smaller than the majority determination result; and
wherein said detection value conversion unit converts the positive phase moving amount detection values to +360°+the positive phase moving amount detection values when it is determined that a number of positive detection values is smaller than the majority determination result;
an averaging processing unit which executes processing for adding the phase moving amount detection values read out from said frequency offset detection unit and converted by said detection value conversion unit and dividing a sum by the number of added values;
a correction value calculation unit which calculates a frequency offset from the phase moving amounts after averaging processing by said averaging processing unit; and
a Temperature Compensated Crystal Oscillator (TCXO) control unit which corrects a TCXO control on the basis of the frequency offset calculated by said correction value calculation unit.

9. The AFC unit according to claim 8, wherein said majority determination unit determines the shift direction of a frequency offset by majority determination before averaging processing and making the signs of detection values coincide from the majority determination result.

10. A frequency offset detection processing system comprising:
a TCXO (Temperature Compensated Crystal Oscillator, Temperature Compensated X'tal Oscillator) which generates a reference frequency;
a demodulation unit which demodulates a reception signal;
a frequency offset detection unit which detects a frequency offset from a phase moving amount between symbols of adjacent pilot signals; and
an AFC (Auto Frequency Control) control unit, characterized in that said AFC control unit comprises:
a majority determination unit which determines whether each of phase moving amount detection values by a plurality of frequency offsets, which are detected for a predetermined time and read out from said frequency offset detection unit, is a positive value or a negative value, and totalizes to determine which of the positive values and the negative values are larger in number;
a detection value conversion unit which converts the phase moving amount detection values read out from said frequency offset detection unit in accordance with a majority determination result from said majority determination unit;
an averaging processing unit which executes processing for adding the phase moving amount detection values read out from said frequency offset detection unit and converted by said detection value conversion unit and dividing a sum by the number of added values;
a correction value calculation unit which calculates a frequency offset from the phase moving amounts after averaging processing by said averaging processing unit; and
a TCXO control unit which corrects TCXO control on the basis of the frequency offset calculated by said correction value calculation unit,
wherein a distribution of the phase shift detection values after conversion in accordance with a majority determination result from said majority determination result in a Gaussian distribution, and
wherein a central value of the distribution and an average value of the distribution have approximately the same value.

11. An AFC (Auto Frequency Control) unit comprising:
a majority determination unit which determines whether each of phase moving amount detection values by a plurality of frequency offsets, which are detected for a predetermined time and read out from said frequency offset detection unit, is a positive value or a negative value, and totalizes to determine which of the positive values and the negative values are larger in number;
a detection value conversion unit which converts the phase moving amount detection values read out from said frequency offset detection unit in accordance with a majority determination result from said majority determination unit;
an averaging processing unit which executes processing for adding the phase moving amount detection values read out from said frequency offset detection unit and converted by said detection value conversion unit and dividing a sum by the number of added values;
a correction value calculation unit which calculates a frequency offset from the phase moving amounts after averaging processing by said averaging processing unit; and
a Temperature Compensated Crystal Oscillator (TCXO) control unit which corrects a TCXO control on the basis of the frequency offset calculated by said correction value calculation unit,
wherein a distribution of the phase shift detection values after conversion in accordance with a majority determination result from said majority determination result in a Gaussian distribution, and
wherein a central value (actual phase shift) of the distribution and an average value (detection value after processing) of the distribution have approximately the same value.

* * * * *